(12) United States Patent
Douglass

(10) Patent No.: US 6,205,907 B1
(45) Date of Patent: Mar. 27, 2001

(54) METHOD OF MAKING FIBER REINFORCED ELASTOMERIC DIAPHRAGMS AND FIBER REINFORCED DIAPHRAGMS

(75) Inventor: Stephen L. Douglass, Newbury, OH (US)

(73) Assignee: Thermotion Corporation, Mentor, OH (US)

(*) Notice: Subject to any disclaimer, the term of this patent is extended or adjusted under 35 U.S.C. 154(b) by 0 days.

(21) Appl. No.: 09/273,539

(22) Filed: Mar. 22, 1999

(51) Int. Cl.[7] .................................................. F01D 19/00
(52) U.S. Cl. .................................... 92/98 R; 92/103 F
(58) Field of Search ............................ 92/96, 97, 98 R, 92/99, 100, 101, 102, 98 D, 103 F

(56) References Cited

U.S. PATENT DOCUMENTS 3,659,448 * 5/1972 Schaus ................................. 92/98 R
4,741,252 * 5/1988 Harter et al. ......................... 92/102
6,067,893 * 5/2000 Drahusz, Jr. ......................... 92/98 R

* cited by examiner

*Primary Examiner*—Edward K. Look
*Assistant Examiner*—Hermes Rodriguez
(74) *Attorney, Agent, or Firm*—Leydig, Voit & Mayer, Ltd.

(57) ABSTRACT

A method of making an elastomeric diaphragm includes preparing a mixture of an elastomer containing dispersed fibers; heating the mixture so that the mixture flows under pressure; injecting the mixture into a mold having a cavity in the configuration of a diaphragm with a central axis of symmetry, so that the mixture flows into the mold along the central axis of symmetry of the diaphragm and, within the mold, parallel to the central axis of symmetry, until the mold is filled, with the fibers substantially oriented to lie within planes including the central axis of symmetry; at least partially curing the diaphragm; opening the mold; and removing the diaphragm from the mold. An elastomeric diaphragm has a central axis of symmetry and includes an elastomeric body with reinforcing fibers dispersed throughout the elastomeric body, the fibers being oriented to lie within planes including the central axis of symmetry.

18 Claims, 2 Drawing Sheets

METHOD OF MAKING FIBER REINFORCED ELASTOMERIC DIAPHRAGMS AND FIBER REINFORCED DIAPHRAGMS

TECHNICAL FIELD

This invention relates to elastomeric diaphragms and, particularly, non-planar, high aspect ratio elastomeric diaphragms, including reinforcing fibers oriented within the diaphragms to reinforce the diaphragms anisotropically. The invention further relates to diaphragms formed using the novel method.

BACKGROUND ART

Elastomeric diaphragms are widely used in many applications. The resilience of the diaphragms permits them to change in shape in response to, for example, an imbalance in fluid pressures applied to opposite sides of the diaphragm. A diaphragm may have any shape. The diaphragms of principal interest for the invention comprise an elastomeric material that is constrained at its periphery so that differential forces can be applied, causing the diaphragm to be at least locally distended and/or displaced in response to an imbalance in pressures applied to opposite sides of the diaphragm. The diaphragm isolates the pressure applying medium on one side of the diaphragm from the medium on the other side. A diaphragm may convert a fluid pressure into a mechanical force that can be employed to actuate some other element in response to the diaphragm displacement. Likewise, a mechanical force applied to a diaphragm by a plunger or other mechanical element causes an increase in fluid pressure on an opposite side of the diaphragm. The transferred pressure can be applied in many ways, for example, in a pump in which the diaphragm isolates the mechanical driving element from a pumped fluid.

Although the simplest diaphragm configurations are planar, elastomeric diaphragms are not restricted to such simple shapes. For example, a diaphragm may include a protruding shape for receiving a mechanical plunger or for responding in a non-linear way to a fluid or mechanical force. The walls of a protruding portion of a diaphragm may engage a mechanical plunger so that the configuration of the diaphragm changes as the position of the plunger changes in response to applied forces. A diaphragm engaging a plunger and following its movement through a circumferential fold can be considered to "roll". The circumferential fold in the diaphragm changes in position with the position of the plunger engaging the diaphragm. An example of such a rolling diaphragm in two different positions is illustrated in FIGS. 1 and 2 of U.S. Pat. No. 4,887,429, which is incorporated by reference.

The repeated flexing of a diaphragm in response to changes in pressure can gradually weaken a diaphragm. Moreover, each elastomer used in a diaphragm has an elastic limit and limited strength. The strength of a diaphragm may be changed by altering the thickness of a particular elastomer or by selecting a different elastomer. However, changing thickness may not be permissible in some applications where space is limited and diaphragm thickness is critical. Further, changing elastomer thicknesses or changing elastomers causes changes in elastic characteristics, such as stiffness, that affect the suitability of a diaphragm in a particular application.

One technique for increasing the tensile strength of elastomers, such as rubbers, beyond their inherent tensile strengths is the embedding of a reinforcing fabric within the elastomer. The conventional reinforcing fabrics have woven fibers or threads, usually woven biaxially, i.e., in two orthogonal directions. Fabrics conventionally used for such reinforcements include nylon and polyester.

A reinforcing fabric may be embedded within a planar elastomeric diaphragm or in a non-planar diaphragm, such as the high aspect ratio diaphragm illustrated in FIG. 1. The diaphragm of FIG. 1 has a peripheral flange 1 from which a conical part 3 of the diaphragm projects. The conical part 3 includes a relatively planar end surface 5 generally parallel to the flange 1. Together, the conical part 3 and the end surface 5 in the illustrated diaphragm describe major parts of the surface of a frustrum of a cone. As used here, the term high aspect ratio diaphragm means a non-planar diaphragm having a permanent projection, like the conical part 3 of FIG. 1, extending outwardly from a flange or other mounting part so that, when not stressed by applied pressure, the diaphragm does not lie in a single plane.

In a planar diaphragm, the reinforcing fabric is distorted only when the diaphragm is distorted by an applied pressure. In a high aspect ratio diaphragm, such as illustrated in FIG. 1, the reinforcing fabric is distorted from the intersection of the end surface 5 and the conical part 3 to the intersection of the conical part 3 and the flange 1. This distortion creates four regions, essentially at lines equally spaced around the conical part 3 of the diaphragm, where the yarn pattern of the fabric is particularly irregular. This phenomenon is called "four-cornering" and often results in excessive wear along those four lines as the diaphragm repeatedly flexes in response to applied forces.

Fabric reinforced diaphragms are typically made by clamping the reinforcing fabric and supplying a molten or flowable semi-solid elastomeric material to embed the fabric. Alternatively, the fabric may be compression molded between elastomeric sheets. When a high aspect ratio diaphragm, for example, having the configuration shown in FIG. 1, is manufactured, the fabric is typically formed on a mandrel or other projection of a mold. An elastomeric sheet may be first placed in the mold and the fabric and another elastomeric sheet placed on top of the fabric. Alternatively, after placement of the fabric, a molten or semi-molten elastomer is supplied to embed the fabric. The placement of a conventional fabric over a projecting mandrel is an initial source of distortion of the biaxial arrangement of the weave and fill yarns or threads of the fabric. It is this distortion of the fabric during manufacturing that leads to the "four-cornering" effect.

The fabric in a reinforced diaphragm inherently has a much lower elasticity than the elastomer, resulting in significant and even extreme localized compression of the elastomer when a diaphragm having the configuration shown in FIG. 1 "rolls". In that operation, because of an applied mechanical force, the planar end surface 5 moves transversely to that surface and includes a circumferential fold where the diaphragm has a 180° bend or turn. The location of this bend on the conical part 3 changes as the diaphragm rolls. This bend significantly increases the frictional forces generated when the diaphragm is actuated. Generally, elastomers subjected to repeated compression cycles are likely to fail, unlike the well known durability of rubber and other elastomers in tensile cycles. Particularly in diaphragms having the configuration shown in FIG. 1 and a relatively small end surface area, the compression, i.e., frictional forces, produced upon repeated flexing, i.e., rolling, of the diaphragm can substantially decrease the lifetime of the diaphragm.

In a generally planar diaphragm including a fabric reinforcement, similar problems can arise. Although the reinforcing fabric is not flexed when a planar diaphragm is at rest, because of the nature of the distortion of the diaphragm when distended, similar frictional forces attributable to a non-symmetrical distortion of the fabric and compression of the elastomer can arise. These compressive and frictional cycles can lead to premature failure of an elastomeric diaphragm.

SUMMARY OF THE INVENTION

Accordingly, it is an object of the invention to provide a method of making a reinforced elastomeric diaphragm avoiding the "four-cornering" effect experienced with fabric reinforced diaphragms.

Further, it is an object of the invention to provide a reinforced elastomeric diaphragm with anisotropic strength, providing tensile strength along a direction of stretching, folding, and rolling of such a diaphragm.

It is another object of the invention to provide a method of making a reinforced elastomeric diaphragm having desired anisotropic tensile strength properties.

According to one aspect of the invention, a method of making an elastomeric diaphragm includes preparing a mixture of an elastomer containing dispersed fibers; heating the mixture so that the mixture flows under pressure; injecting the mixture into a mold having a cavity in the configuration of a diaphragm with a central axis of symmetry, so that the mixture flows into the mold along the central axis of symmetry of the diaphragm and, within the mold, within the planes including the central axis of symmetry, until the mold is filled, so that the fibers lie substantially within planes including the central axis of symmetry; opening the mold; and removing the diaphragm from the mold.

In another aspect of the invention, an elastomeric diaphragm has a central axis of symmetry and includes an elastomeric body with reinforcing fibers dispersed throughout the elastomeric body, the fibers being oriented to lie within planes including the central axis of symmetry.

DETAILED DESCRIPTION OF PREFERRED EMBODIMENTS

Figure 1:
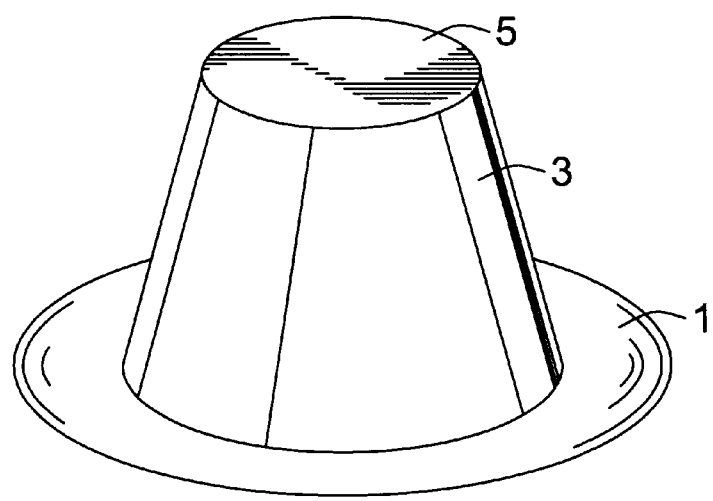
FIG. 1 is a perspective view of a high aspect ratio elastomeric diaphragm.

An important feature of the invention is reinforcement within the elastomer of the diaphragm without an embedded fabric. In the invention, the fabric yarn of prior art reinforced diaphragms is replaced by short length fibers embedded in the elastomer and oriented to provide not only a homogeneous distribution but also increased strength of the diaphragm along directions that are most stressed and most susceptible to failure. These desired results are achieved according to the invention by manufacturing diaphragms by injection molding of an elastomer containing a dispersion of fibers.

High aspect ratio elastomer diaphragms having highly desirable properties have been prepared according to the invention, employing as a raw material an elastomer containing dispersed aramid pulp, i.e., short, high surface area aramid fibers. The aramid fibers, sold as KEVLAR, a trademark of DuPont de Nemours of Wilmington, Del., are available from DuPont dispersed within various elastomeric materials, such as polychloroprene rubber, styrene-butadiene rubber (SBR), acrylonitrile-butadiene rubber (NBR), and natural rubber. These products are referred to by DuPont, and sometimes here, as engineered elastomers. Aramid fibers are about five times stronger than steel, based upon a weight-for-weight comparison.

The engineered elastomers are homogeneous blends intended to be used as raw material in making other elastomeric products. As well known in the art of processing rubber, these raw products are blended with other ingredients, such as carbon black, vulcanizing materials, and other materials, such as oil and magnesium oxide. Curing agents may also be added. These blending processes use mechanical means applying shear forces, such as rolling mills or rubber mixers. The composition of the blended materials is characterized by the fractional component content, phr, i.e., parts per hundred of basic rubber. The temperature of the materials being blended is carefully controlled and, as is conventional in the art, the various additives are supplied at particular respective temperatures. With regard to the DuPont engineered elastomers, instructions are supplied by DuPont to supplement the knowledge in the art. In the blending process, the percentage of rubber in the final composition decreases as other materials are added.

In a typically available raw material, an engineered elastomer containing KEVLAR in an NBR matrix is about twenty-three percent by weight aramid, corresponding to the conventional designation of thirty parts per hundred rubber (phr). In order to reduce the proportion of KEVLAR and to provide an elastomer from which a useful diaphragm can be prepared, this raw material was mixed with additional nitrile rubber, carbon black, and vulcanizing ingredients, using conventional technology, to produce a product with a rubber content of ten phr. Since this material proved strong but relatively stiff, further blending with NBR was carried out to produce materials having KEVLAR levels of five phr and two phr.

Figure 2:
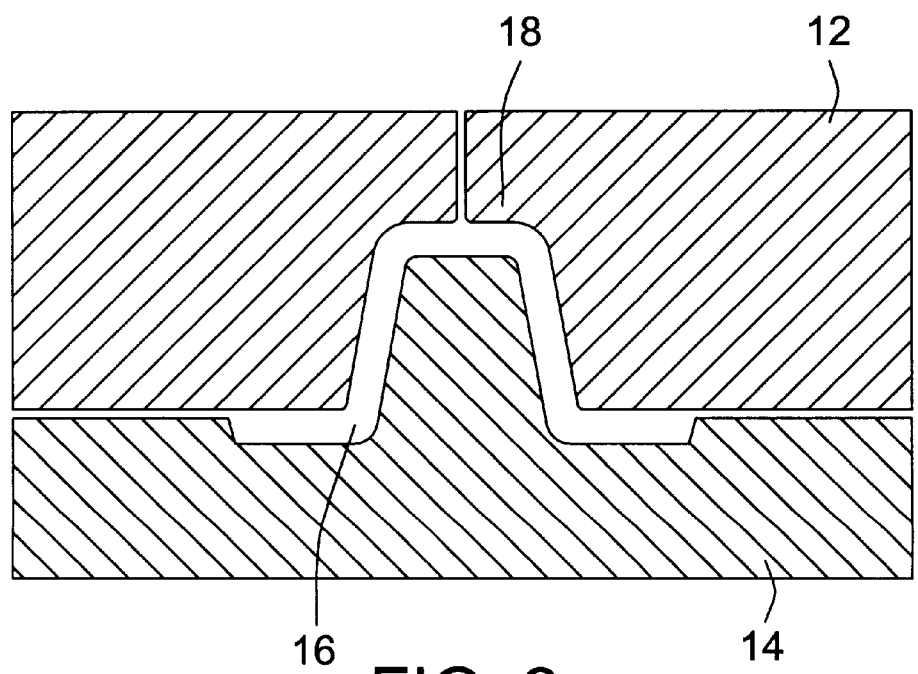
FIG. 2 is a schematic cross-sectional view of a mold, illustrating a method of making the diaphragm of FIG. 1 by injection molding.

The preferred method of making a diaphragm according to the invention, particularly a high aspect ratio diaphragm, i.e., one that is not planar but, rather, has a shape similar to the diaphragm configuration of FIG. 1, is injection molding. A cross-sectional view of a mold employed in a process of manufacturing a diaphragm having the configuration of FIG. 1 is shown in FIG. 2. The mold 10 includes upper and lower mold halves 12 and 14 that define a cavity 16 having the shape of the diaphragm that is to be produced. The mold halves are sufficiently spaced apart to allow air to escape as a viscous heated elastomer mixture is injected into the mold. An important feature of the invention is the location of the gate 18 of the mold in a central position so that the elastomer mixture is injected into the mold along the central axis of symmetry of the diaphragm and so that the mixture flows within the mold generally within planes including that axis.

In a typical injection molding process according to the invention, the elastomer mixture including the fibers, after blending to achieve a desired fiber, e.g., aramid, content, for example, from two to ten phr, is heated in order to produce a flowable mixture. The mixture is heated to about 220° F., a temperature not high enough to cause polymerization, and is injected under pressure through the gate 18 and into the mold cavity 16. After the elastomer is injected into the mold it is allowed to cure, at least partially, to take a permanent shape. Then, the mold halves are parted and the molded diaphragm is removed from the mold. The mold halves may be opened after the diaphragm has completely cooled or, more likely, before complete cooling. In the latter event, the molded diaphragm may be heated and further cured outside the mold. Any excess elastomer at the edge of the flange or remaining at locations near the gate is removed by trimming.

Figure 3:
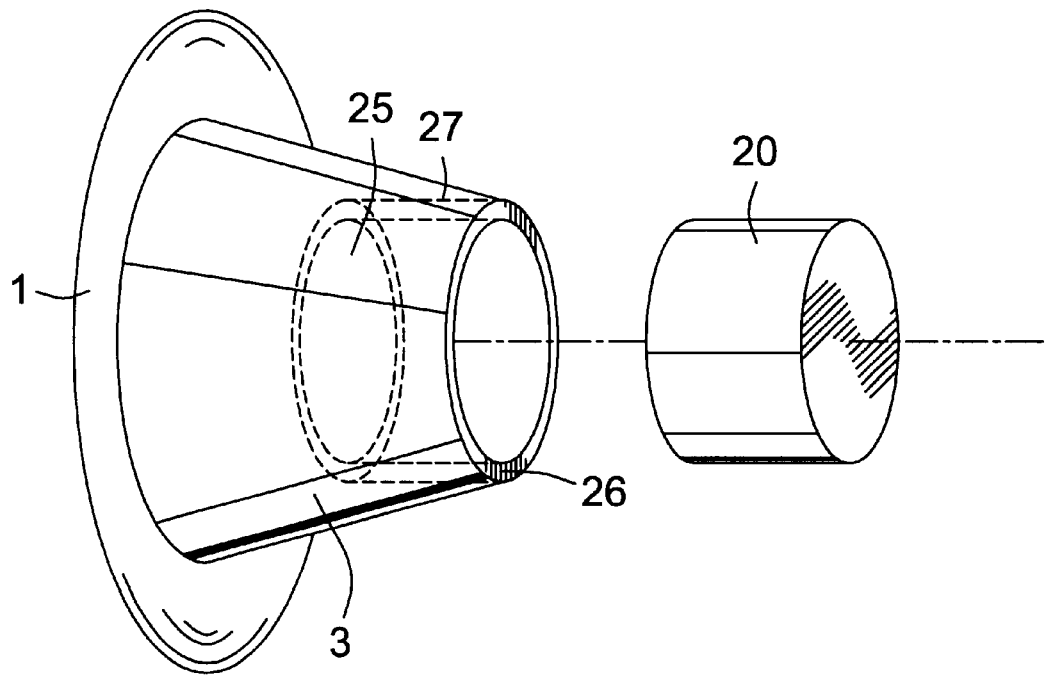
FIG. 3 is a perspective view of a pre-convoluted high aspect ratio elastomeric diaphragm acted upon by a piston.

In the described molding process, the fibers within the elastomer being injected into the mold tend to align themselves with the direction of flow of the viscous mixture being injected under pressure into the mold cavity 16. Thus, in the high aspect ratio configuration diaphragm illustrated in FIG. 1, the fibers in the end surface 5, in the conical part 3, and in the flange 1 are highly oriented and lie within planes including the central axis of symmetry of the diaphragm. As a result, the diaphragm is strengthened, to the largest degree, in planes including that axis of symmetry. In the conical part 3, the maximum tensile strength increase is in a direction extending from the flange 1 to the end surface 5. It is this region of the diaphragm that receives the greatest stresses as the diaphragm stretches and retracts or as it rolls with a 180° bend, following the motion of a piston applied to the end surface 5 that rolls part of the diaphragm into the volume within the conical part 3 of the diaphragm, as shown in FIG. 3 described below. By contrast, the tensile strength is not substantially increased transverse to the axis of symmetry, i.e., parallel to the end surface 5 and the flange 1, facilitating rolling of the diaphragm without undue friction, heating, and premature failure of the diaphragm. There is no fixed pattern of the fibers within the unitary elastomer body of the diaphragm, unlike the yarn of a fabric within a diaphragm. Therefore, the asymmetrical stresses and four-cornering effects observed when a diaphragm is reinforced with a fabric cannot occur in diaphragms according to the invention.

In FIG. 3, a modified rolling diaphragm and a piston 20 used to displace a wall of the diaphragm is shown in a schematic perspective view. The diaphragm of FIG. 3 differs from the diaphragm of FIG. 1 in that the planar end surface 5 is replaced by a recessed end surface 25, indicated in phantom lines in FIG. 3. In manufacturing the diaphragm of FIG. 3, the end is "pre-convoluted", meaning that the 180° bend or turn at the end is permanently molded into the diaphragm. Thus, there is a peripheral fold 26 at the top of the conical portion 3 so that the wall of the diaphragm extends continuously from the outside of the conical portion 3 inside the cone along the wall portion 27 that ends in the end surface 25. In the normal operating position, the piston 20 is partially located within the recess defined by the wall 27 in the end surface 25. When the piston 20 is displaced toward the right in FIG. 3 due to an increase of pressure on the opposite side of the diaphragm, the end surface 25 is displaced, causing rolling of the fold 26. In a similar application using the diaphragm illustrated in FIG. 1, the piston normally presses against and displaces the end surface 5. This displacement causes stretching of the diaphragm when in an unactuated position. This stretching can lead to premature failure, for example, by chemical attack from the ambient of the stretched rubber part of the diaphragm. The quiescent position of the diaphragm illustrated in FIG. 3 is not stretched, increasing its lifetime. Stretching only occurs upon actuation of the diaphragm and displacement of the piston 20.

Figure 4:
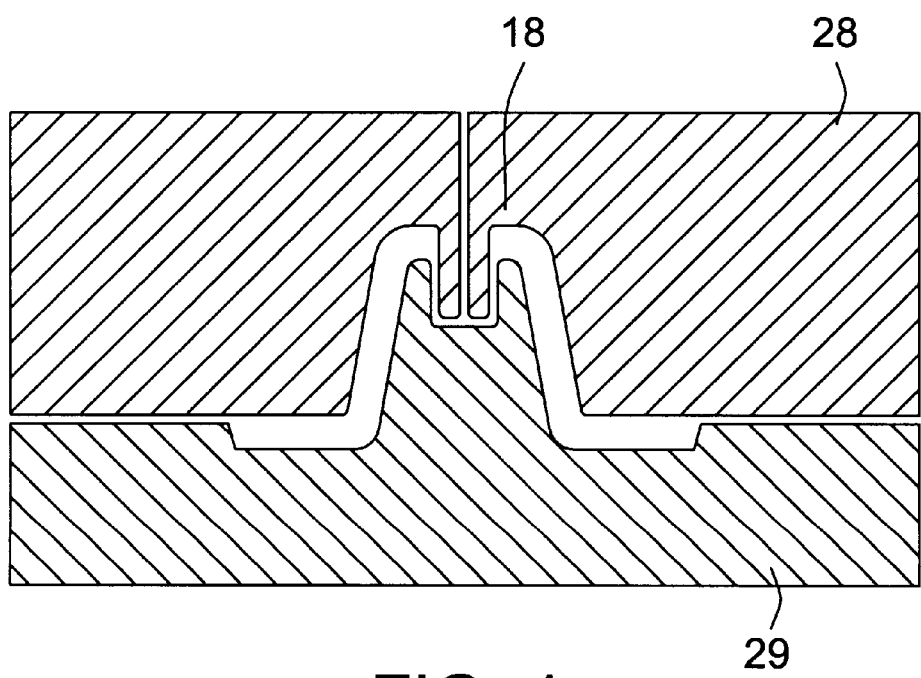
FIG. 4 is a schematic cross-sectional view of a mold, illustrating a method of making the diaphragm of FIG. 3 by injection molding.

The diaphragm of FIG. 3 would be extremely difficult to manufacture employing a fabric reinforced material. However, in the invention, a mold having the cross-sectional structure shown in FIG. 4 can be employed. The mold is similar to the mold of FIG. 2 except that a recessed portion in the center is present in order to form the recess including the wall 27 and the end surface 25, as shown in FIG. 3. The mold includes an upper mold half 28 and a lower mold half 29. As in the mold of FIG. 2, the gate 18 is centrally located to provide for radial flow of the elastomer mixture that is injected into the mold to produce the diaphragm.

The same considerations apply and the same advantages are achieved in planar and pre-convoluted diaphragms according to the invention. The injection molding gate 18 is located at the center of the diaphragm so that fibers in the elastomer are radially aligned, as in the end surfaces 5 and 25 of the high aspect ratio diaphragms. The fibers increase the tensile strength of the diaphragm along radial directions where the stress is greatest.

The precise composition, i.e., dilution, of an elastomer for use in diaphragms according to the invention depends upon the particular application to be made of a diaphragm. High aspect ratio diaphragms made from elastomers of ten phr have proven very strong but relatively stiff and, therefore, inappropriate for some applications. However, this blend of elastomer with oriented fibers may be of substantial use in planar or near planar, i.e., low aspect ratio, diaphragms. Diaphragms made from elastomers with a much lower fiber, e.g., aramid, content, e.g., two phr, have been manufactured according to the invention and have proven extremely durable in applications, such as that described in U.S. Pat. No. 4,887,429 mentioned above. These diaphragms have survived more than eighty thousand rolling cycles without failure. Based upon that performance and the measured weight loss of the samples, diaphragm life in excess of one hundred thousand rolling cycles is expected. Elastomers with intermediate fiber compositions, i.e., two to ten phr, are, based upon experience, expected to be useful in various applications. Lower fiber content diaphragms are substantially weaker than diaphragms with conventional fabric reinforcements although they have improved flexibility.

Although the readily available raw materials of elastomers with embedded fibers are those described above, the invention is not restricted to use of DuPont engineered elastomers. Different rubber materials, for example, hydrogenated nitrile-butadiene rubber (HNBR) and polyepichlorohydrin (Hydrin), and different fibers, for example, polyester, embedded in the elastomer is as useful and as effective as the examples described above. HNBR is particularly effective in avoiding breakdown of rubber due to ozone attack.

The invention is applicable to diaphragms of virtually any configuration or shape, not only the "pilgrim hat" and pre-convoluted shapes of FIGS. 1 and 3, provided the elastomer is formed by injection molding with the molding mixture introduced at a central location of the mold so that the desired alignment of fibers, generally parallel to a central axis of symmetry of the diaphragm, occurs during the molding process. The resulting fiber alignment provides increased tensile strength along directions aligned with, i.e., coplanar with, the axis of symmetry of the diaphragm, the direction that receives the maximum tensile stress.

Although the invention has been described with respect to certain preferred embodiments, various additions and modifications will occur to those of skill in the art from the foregoing description. Accordingly, the scope of the invention is defined by the following claims.

What is claimed is:

1. A method of making an elastomeric diaphragm including:
   preparing a mixture of an elastomer containing dispersed fibers;
   heating the mixture so that the mixture flows under pressure;
   injecting the mixture into a mold having a cavity in the configuration of a diaphragm with a central axis of symmetry so that the mixture flows into the mold along the central axis of symmetry of the diaphragm and, within the mold, within planes including the central axis of symmetry, until the mold is filled, so that the fibers lie substantially within planes including the central axis of symmetry;
   opening the mold; and
   removing the diaphragm from the mold.

2. The method of claim 1 wherein the diaphragm has a unitary body with a high aspect ratio and including a generally planar flange, a conical part having a larger base attached to the flange, and a smaller base including a generally planar end surface.

3. The method of claim 1 wherein the diaphragm has a unitary body with a high aspect ratio and generally including a planar flange, a conical part having a larger base attached to the flange, and a smaller base including a recess extending into the conical part and having a generally planar end surface continuous with and attached to the conical part through a side wall of the recess.

4. The method of claim 1 wherein the diaphragm is generally planar.

5. The method of claim 1 wherein the mixture has a fiber content of from two to ten phr.

6. The method of claim 1 wherein the mixture includes acrylonitrile-butadiene rubber and the fibers are aramid fibers.

7. The method of claim 1 wherein the mixture includes hydrogenated nitrile-butadiene rubber.

8. The method of claim 1 wherein the mixture includes polyepichlorohydrin.

9. The method of claim 1 including at least partially curing the diaphragm before opening the mold.

10. An elastomeric diaphragm having a central axis of symmetry and including a unitary elastomeric body with reinforcing fibers dispersed throughout the elastomeric body, the fibers being oriented to lie within planes including the central axis of symmetry.

11. The diaphragm of claim 10 wherein the elastomeric body has a high aspect ratio and includes a generally planar flange, a conical part having a larger base attached to the flange, and a smaller base including a generally planar end surface.

12. The diaphragm of claim 10 wherein the elastomeric body has a high aspect ratio and includes a generally planar flange, a conical part having a larger base attached to the flange, and a smaller base including a recess extending into the conical part and having a generally planar end surface continuous with and attached to the conical part through a side wall of the recess.

13. The diaphragm of claim 10 wherein the diaphragm is generally planar.

14. The diaphragm of claim 10 wherein the elastomeric body has a fiber content of from two to ten phr.

15. The diaphragm of claim 10 wherein the elastomeric body includes acrylonitrile-butadiene rubber and the fibers are aramid fibers.

16. The diaphragm of claim 10 wherein the mixture includes hydrogenated nitrile-butadiene rubber.

17. The diaphragm of claim 10 wherein the mixture includes polyepichlorohydrin.

18. The diaphragm of claim 10 wherein the elastomer body is free of woven fibers.

* * * * *